UNITED STATES PATENT OFFICE.

WILLIS A. GIBBONS, OF NEW YORK, N. Y., ASSIGNOR TO AMERICAN RUBBER COMPANY, A CORPORATION OF MASSACHUSETTS.

METHOD OF WORKING QUICK-CURING COMPOUNDS.

1,427,283.   Specification of Letters Patent.   Patented Aug. 29, 1922.

No Drawing.   Application filed March 31, 1921. Serial No. 457,501.

*To all whom it may concern:*

Be it known that I, WILLIS A. GIBBONS, a citizen of the United States, residing in New York, county of New York and State of New York, have invented new and useful Improvements in Methods of Working Quick-Curing Compounds, of which the following is a full, clear, and exact description.

This invention relates to the handling of vulcanizable rubber compositions and particularly when they include quick curatives.

In mixing vulcanizable rubber compositions, in skim or friction coating the same onto fabric, in forming the plastic material into sheets or lengths and like manipulations, it is commercially necessary or desirable to employ mills, mixers, calenders or tubing machines which have powerfully operated rolls or other devices for working the mass into a uniform condition. The crude rubber employed is relatively stiff and requires vigorous treatment to break it down or soften it before or during the operations mentioned. Usually the rolls are heated but whether or no the rubber ordinarily attains a temperature of approximately 212° F. which is prohibitive for incorporating quick curatives or accelerators or both, i. e. substances that either or both shorten the duration of cure and lower the temperature required during the cure.

I have discovered that by softening the rubber with a solvent, such as solvent naphtha, quick curatives may be milled, mixed, calendered or tubed with facility and without vulcanizing prematurely on machines of a suitable type or in other words mechanically.

According to the invention and by way of illustration I may take 100 parts of rubber, 10 parts zinc oxide, and from 5 to 20 parts of solvent naphtha and mix them on a mill or in a mixing machine without developing nearly as much heat as heretofore owing to the fact that the solvent naphtha reduces the mass to a pasty consistency, not requiring much force (as compared to the old methods) to work it. When of the desired plasticity, 3 parts of each of the following substances, paratoluidine, sulphur, and dibutyldixanthicdisulphide, may be added and blended without a substantial or prohibitive vulcanization occurring in the treatment from the internal friction of working. The batch may be either calendered or tubed without danger of premature vulcanization owing to the relative low temperature at which it works.

The amount of solvent naphtha or other softening agent required varies of course with the composition of the stock. In imitation leather for instance having 100 parts of dry filler such as cotton fibres as much of 50 to 100 parts of naphtha may be required. In general heavily compounded stocks require more work in milling and hence more solvent naphtha for softening than pure gum compounds.

The solvent naphtha may be evaporated from a calendered stock or article in the making by allowing it to stand at room temperature or by subjecting it to a heat of 150° F. until sufficiently dried. In certain classes of goods such as coated fabrics the solvent naphtha may be disregarded, reliance in such cases being placed upon vulcanization to remove it.

Vulcanization of the article to complete it for the market may be performed at temperatures and for periods suitable to the particular ingredients employed.

The invention contemplates any of the various accelerators and quick curatives known to the trade, as such, are all apparently susceptible of advantageous treatment by a softening agent in the same way.

While solvent naphtha is the preferred softening agent or solvent, various volatile agents such as benzol, toluene, gasolene, chlorinated aromatic or aliphatic hydrocarbons, essential oils of the terpene and allied series, hydrocarbons of the terpene and allied series and derivatives thereof, esters, amines for example aniline or non-volatile agents such as heavy hydrocarbons of the aromatic or aliphatic series, heavy petroleum oil, anthracene, tars, such as coal tar or pine tar and products obtained by distillation therefrom, esters including vegetable oils or glycerides of the fatty acids, heavy oils of the terpene and allied series, such as camphor oil, chlorinated heavy hydrocarbons of the aliphatic and aromatic series, true waxes or esters of the fatty acids and monatomic alcohols, waxes of the hydrocarbon variety, such as paraffin and ceresin, and glycerin may be employed with more or less the same advantage.

Having thus described my invention, what I claim and desire to protect by Letters Patent is:

1. That method of compounding or mechanically manipulating vulcanizable rubber compositions containing accelerating substances which either or both shorten the duration of cure or lessen the temperature required, which consists in, maintaining the rubber softened to prevent substantial vulcanization while mechanically working the composition.

2. That method of compounding or mechanically manipulating rubber and compounds including accelerators which consists in adding a volatile softening agent reducing the viscosity of the rubber and permitting mastication and blending thereof without premature vulcanization.

3. Working rubber and compounds including accelerators in the presence of solvent naphtha in quantity sufficient to bring the rubber to a pasty consistency at least so as to permit milling, calendering, tubing and like mechanical treatment without heating to a degree causing a substantial amount of vulcanization.

Signed at New York, New York, this 25th day of March, 1921.

WILLIS A. GIBBONS.